Figure 1:
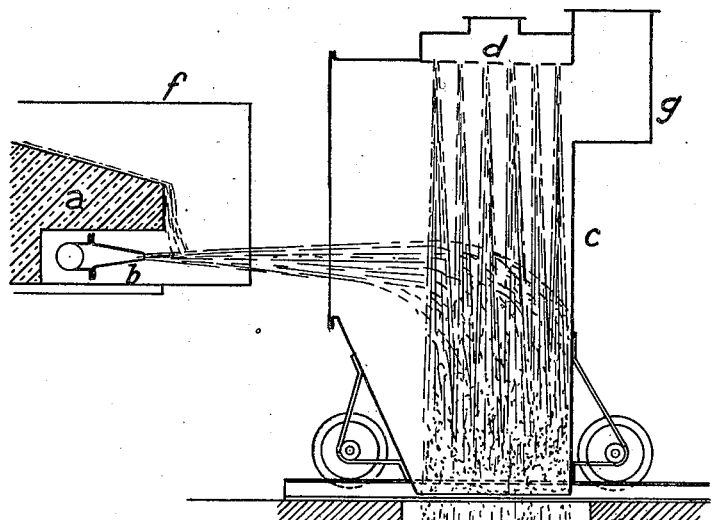

March 5, 1929.　　C. VON GIRSEWALD ET AL　　1,704,599
DISINTEGRATED ALUMINA
Filed May 28, 1927

Inventors
Conway von Girsewald,
Hans Siegens,
Martin Marchner
By Byrnes, Townsend & Brickenstein
Attorneys.

Patented Mar. 5, 1929.

1,704,599

UNITED STATES PATENT OFFICE.

CONWAY VON GIRSEWALD, OF FRANKFORT-ON-THE-MAIN, AND HANS SIEGENS, OF HORREM, NEAR COLOGNE, AND MARTIN MARSCHNER, OF FRANKFORT-ON-THE-MAIN, GERMANY, ASSIGNORS TO METALLGESELLSCHAFT AKTIENGESELLSCHAFT, OF FRANKFORT-ON-THE-MAIN, GERMANY, A CORPORATION OF GERMANY.

DISINTEGRATED ALUMINA.

Application filed May 28, 1927, Serial No. 195,123, and in Germany May 8, 1926.

This invention relates to a method for making disintegrated alumina from a melt of alumina. The invention also refers to a device for the execution of the new method and to the special use of the products obtained by the method.

It is a known fact, that alumina obtained from a melt is an extremely hard material, which only with difficulty can be disintegrated to such a degree of fineness, as is necessary when using it as raw material for making aluminum by electrolysis.

The present invention is based on the discovery that molten alumina shrinks considerably and that very small crystals are produced, when the solidification is a very quick one. It was found, that by suitably conducting the quenching process of a melt of alumina material may be obtained, in which the alumina, is present in crystals of a size suited for electrolysis and that these crystals are only fritted together at their edges or corners. The material may therefore easily be disintegrated in an edge mill or similar simple disintegrator. Besides this important simplification of the disintegration another surprising improvement is obtained by the invention. The fine crystalline alumina obtained by the quick quenching is more easily electrolyzed than an alumina, which is not quenched or is only slowly quenched.

The granulating by quenching of alumina is known; the usual quenching methods such as the casting of fused alumina into water or spraying fused alumina with water are however not sufficient to obtain the same results as are obtained when working according to the method of the present invention. These methods further have the disadvantage, that at the high temperature of the fused alumina (about 2000° C.) local superheating of the water and production of oxyhydrogen gas occur, so that explosions may take place.

According to our invention the fused alumina is first brought into a state of fine distribution and in this state subjected to a quick quenching. Thus for example the stream of fused alumina flowing out from the furnace may be atomized and the fine drops obtained are because of their small diameter and their relatively great surface already strongly cooled, when passing them through cooled and preferably stirred air. It is obvious, that the best results are obtained, when the velocity with which the atomized alumina passes through the cooling medium, such as air or other gases or vapors or mixtures of gases and vapors, is as great as possible and the passage space is a long one.

The air or gas cooling may be followed by a further cooling for example with water. The fine drops of alumina are then first thrown through the air and caught in cold water, which preferably is in motion, for example, flowing. The drops are then cooled so much by the air, that superheating and decomposition of the water does not take place.

The atomizing of the fused alumina may be done in different ways. One may for example let the stream of fused alumina drop upon suitably shaped supports effecting a fine distribution of the fused mass. Another way is to beat the stream of fused alumina by quickly rotating shovel wheels or to let it drop upon quickly rotating shovel wheels, thereby distributing it. Such atomizers may be arranged above the cooling liquid or close below the level of the cooling liquid, into which the atomized material is to drop. In the latter case the atomizer is protected by cooling and the cooling liquid at the same time thoroughly stirred and prevented from superheating. When using rotating atomizing disks one may also preferably work in such a manner that cool air or other gases or vapors are passing along the border of the atomizing disk. The atomizing of the liquid alumina may also be done by compressed air, steam or other compressed gases, gas mixtures or gas-vapor mixtures blown in a suitable manner against or into the stream of liquid alumina. It is of advantage to bring the atomized liquid alumina then for cooling purposes into contact with finely distributed water or vapors for example with a shower of water and to collect it later in a container filled with water.

The alumina disintegrated according to the invention by quick quenching is as a rule obtained in the form of small hollow balls, in which the crystals are stuck together in such a manner, that the further disintegration by mechanical means can be easily carried out.

In many cases the hollow balls of alumina may even be shattered by pressing them between the fingers.

The disintegrated products have proved to be especially adapted for making aluminum and aluminum alloys by electrolysis. It is a known fact, that the manufacture of alumina is troublesome, because the alumina is not quickly enough dissolved in the bath of fused cryolite. The particles of alumina drop to the bottom of the bath and increase the intermediate resistance from the cathode to the metal, thereby producing an increase of temperature, which tends to the production of carbide and further increase of the intermediate resistance. The bath at the same time becomes poor in alumina, whereby the so-called anode effect is produced.

To avoid these disadvantages it has been recommended to use very finely ground crystalline alumina or to admix calcined alumina. The fine grinding is very expensive and leads to losses by dusting. The admixture of calcined alumina prevents the above described disadvantages only in part. The disadvantages do not occur when alumina is used, which is disintegrated according to our invention by quick quenching. It is less troublesome to work with an alumina prepared by the new method in the form of grains of for example 3 mm. size, than to work with crystalline alumina, which is not quenched and has grains of a size of 0.2 mm. and even less.

Figure 2:
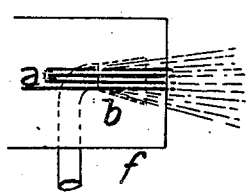

The annexed drawing shows schematically an example of a device adapted for the execution of the new method; wherein Fig. 1 is a vertical section of the device, and Fig. 2 is a detail plan view of the nozzle portion.

The stream $a$ of fused alumina guided by a suitable spout is caught by air leaving the nozzle $b$ and carried finely distributed into the cooler $c$. Here the distributed material is brought into contact with a water shower from the sprinkler $d$ and cooled by extraction of that heat, which is necessary for evaporating the water. The air used for the atomization at the same time serves for carrying away the steam produced.

The material pre-cooled in this manner drops into the water cooled or water containing vessel $e$. For reasons of safety it has been found preferable to arrange the different devices described in such a manner, for example in form of a triangle, that the stream of alumina may not drop unatomized into the water container. The stream of liquid alumina is therefor for example blown away from the spout. Furthermore the water leaving the sprinkler $d$ hits the atomized alumina from above, thereby preventing the steam, which is flowing upwards, for coming in contact with the hot fused mass and being decomposed. If for example the atomizing device $b$ should stop to work for any reason and if at the same time the container $e$ does not contain enough water, the hot liquid alumina would drop into the container $e$ and superheating of the water and explosion would occur. On the other hand sprinkling the atomized alumina from below with water has the disadvantage, that the developed steam moving upwards comes into contact with the hot stream of liquid alumina and tends to the production of explosive oxyhydrogen gas.

In order to prevent the contact of steam developed in the chamber $c$ with unatomized hot alumina it is of advantage to draw the vapors out by a chimney or the like. This chimney is preferably arranged in the upper part of the chamber $c$ opposite to the entrance of the atomized alumina.

It has also proved to be of advantage to arrange beside the spout, protecting walls $f$ preventing a solidification of the liquid alumina before it is caught and atomized by the air stream coming from $b$.

The cooling chamber $c$ may be made movable in order to prevent a blocking up of the room in front of the electric furnace or other source of liquid alumina.

We claim:

1. As a new product alumina for use in electrolysis comprising discrete crystalline particles of small size.

2. As a new product alumina for use in electrolysis comprising discrete crystalline particles about 3 mm. in size.

In testimony whereof we affix our signatures.

CONWAY von GIRSEWALD.
DR. HANS SIEGENS.
DR. MARTIN MARSCHNER.